(12) United States Patent
Fukumoto et al.

(10) Patent No.: US 8,408,890 B2
(45) Date of Patent: Apr. 2, 2013

(54) MOLD SYSTEM FOR COMPOSITE MOLDING

(75) Inventors: Kenji Fukumoto, Obu (JP); Shizuo Jinno, Ohbu (JP); Atsushi Tsukamoto, Ohbu (JP); Toshiaki Hotaka, Tokyo (JP); Fumitaka Kondo, Tokyo (JP); Yasuhiro Sugihara, Tokyo (JP); Kazuma Hisaki, Tokyo (JP)

(73) Assignees: Kabushiki Kaisha Meikiseisakusho, Ohbu-shi (JP); Teijinkasei Kabushiki Kaisha, Tokyo (JP)

( * ) Notice: Subject to any disclaimer, the term of this patent is extended or adjusted under 35 U.S.C. 154(b) by 139 days.

(21) Appl. No.: 11/990,398

(22) PCT Filed: Aug. 9, 2006

(86) PCT No.: PCT/JP2006/315720
§ 371 (c)(1),
(2), (4) Date: Oct. 7, 2009

(87) PCT Pub. No.: WO2007/020844
PCT Pub. Date: Feb. 22, 2007

(65) Prior Publication Data
US 2010/0019411 A1     Jan. 28, 2010

(30) Foreign Application Priority Data
Aug. 17, 2005   (JP) .................... 2005-236668

(51) Int. Cl.
*B29C 45/14*    (2006.01)
*B29C 45/16*    (2006.01)
*B29C 43/18*    (2006.01)
*B29C 43/20*    (2006.01)
*B29C 69/02*    (2006.01)

(52) U.S. Cl. ............ 425/127; 425/129.1; 425/577; 425/588; 425/595; 264/250; 264/328.7; 264/328.8

(58) Field of Classification Search .................. None
See application file for complete search history.

(56) References Cited

U.S. PATENT DOCUMENTS

| | | | |
|---|---|---|---|
| 3,319,300 A | * | 5/1967 | Hehl .............................. 425/470 |
| 3,807,920 A | * | 4/1974 | Aoki .............................. 425/134 |
| 4,726,558 A | * | 2/1988 | Ozone et al. ................. 248/68.1 |
| 4,744,741 A | * | 5/1988 | Glover et al. ................. 425/123 |
| 4,874,654 A | | 10/1989 | Funaki et al. |

(Continued)

FOREIGN PATENT DOCUMENTS

| | | |
|---|---|---|
| EP | 0927618 A1 | 7/1999 |
| JP | 6-15186 A | 8/1988 |

(Continued)

*Primary Examiner* — Edmund H. Lee
(74) *Attorney, Agent, or Firm* — Edwards Wildman Palmer LLP

(57) ABSTRACT

[PROBLEM]To provide a method of molding a composite molded article enabling compression molding without requiring a large sized injection molding machine and a mold system used for that.
[MEANS FOR SOLUTION]A method of molding a composite molded article using a first mold member 13 to mold a primary molded article 29 by primary molding, switching a movable mold member holding the primary molded article 29 with a movable mold member 14 positioned with a second mold member 15, then using a second mold member 15 in which the primary molded article 29 is inserted to mold a secondary molded article 30 by secondary molding, wherein the primary molding and the secondary molding are executed by non-continuous different steps at points of time different from each other.

4 Claims, 14 Drawing Sheets

U.S. PATENT DOCUMENTS

| | | | |
|---|---|---|---|
| 5,007,822 A * | 4/1991 | Hara et al. | 425/575 |
| 5,030,406 A * | 7/1991 | Sorensen | 264/255 |
| 5,049,343 A * | 9/1991 | Sorensen | 264/255 |
| 5,338,592 A | 8/1994 | Ohsumi et al. | |
| 5,756,013 A * | 5/1998 | Yanagihara et al. | 264/1.7 |
| 5,811,169 A | 9/1998 | Ohsumi et al. | |
| 5,863,479 A * | 1/1999 | Ohsumi et al. | 264/162 |
| 6,071,454 A * | 6/2000 | Shimizu et al. | 264/250 |
| 6,129,985 A | 10/2000 | Ohsumi et al. | |
| 6,468,458 B1 * | 10/2002 | Anderson et al. | 264/246 |
| 6,783,346 B2 * | 8/2004 | Bodmer et al. | 425/112 |
| 6,787,094 B2 * | 9/2004 | Collette et al. | 264/513 |
| 2002/0079606 A1 * | 6/2002 | Sandevi et al. | 264/104 |
| 2006/0076709 A1 * | 4/2006 | Rossanese et al. | 264/255 |

FOREIGN PATENT DOCUMENTS

| | | |
|---|---|---|
| JP | 05-131487 | 5/1993 |
| JP | 09-220745 A | 8/1997 |
| JP | 09-280345 | 10/1997 |
| JP | 10-016002 A | 1/1998 |
| JP | 11-105072 | 4/1999 |
| JP | 2002-225078 | 8/2002 |
| JP | 2006-110990 A | 4/2006 |

* cited by examiner

MOLD SYSTEM FOR COMPOSITE MOLDING

TECHNICAL FIELD

The present invention relates to a molding method using a mold system comprising a first mold member, second mold member, and movable member to compression mold a composite molded article.

BACKGROUND ART

As art relating to a method and mold system for injection molding a composite product made of resins of different properties, there are an injection molding method of a composite product and a mold system for injection molding a composite product (see for example Patent Document 1). This Patent Document 1 uses a primary molding unit to mold a primary molded part by primary molding, switches a movable mold holding the primary molded part with a movable mold of a secondary molding unit, and uses a secondary molding unit having the primary molded part as an insert to mold a secondary molded part by secondary molding and thereby simultaneously proceed with the primary molding and secondary molding.

According to the injection molding method and mold system of Patent Document 1 described above, molds are juxtaposed to a fixed platen and movable platen. Therefore, a large sized fixed platen and movable platen become necessary and the shape of the injection molding machine also becomes larger, so this is not suitable for molding a large sized molded article. Further, in order to mold a vehicular use transparent member or other large sized and thin sheet shaped molded article without deviation in sheet thickness and with a high precision, it must be performed by compression molding. According to the technology of Patent Document 1 explained above, however, the clamping operations of the primary molding and secondary molding can only be performed simultaneously and in addition under the same conditions. Therefore, it is substantially impossible to individually perform the compression molding operations by individual mold systems. In particular, the molding method of Patent Document 1 cannot be applied to composite molding of a vehicular use transparent member etc. where compression molding is essential for molding the thin sheet window by the primary molding, but compression molding is not needed for molding the frame at the outer circumference of the window by the secondary molding.

Further, there is a system for producing an injection molded article comprising at least two plastic melts (see for example Patent Document 2). This Patent Document 2 is a type having a fixed mold mounting plate stationarily attached to a machine frame, a mold mounting plate able to move along at least four horizontal tie rods arranged between the fixed mold mounting plate and a counter pressure plate stationarily attached to the machine frame and extending substantially horizontally, and, between them, an additional mold mounting device movable with respect to the mold mounting plate and rotatable around an axis of rotation aligned perpendicular to the longitudinal axis of the horizontal tie rods. The mold mounting device holds mold halves cooperating with mold halves of the mold mounting plates on at least two side surfaces aligned with a spacing from each other and parallel to the axis of rotation. Each of the mold mounting plates is provided with at least one opening. Plasticizing and injection units are connected via these openings to one or more sprue channels in the mold halves held by the mold mounting plates. The two mold halves are simultaneously or directly successively supplied with one or more plastic melts from the injection units connected to the mold halves. Accordingly, according to Patent Document 2 explained above, the mold halves are arranged on the same axis. Therefore, the problem of the larger size of the injection molding machine in Patent Document 1 explained above is solved, but the problem of compression molding being impossible is not solved.

[Patent Document 1] Japanese Patent Publication (A) No. 2002-225078
[Patent Document 2] Japanese Patent Publication (A) No. 11-105072

DISCLOSURE OF THE INVENTION

Problem to be Solved by the Invention

The present invention was made in order to solve the above problem and has as an object thereof to provide a method of molding a composite molded article enabling compression molding without requiring a large sized injection molding machine and a mold system used for the same.

Means for Solving the Problem

Namely, the aspect of the invention relates to a method of molding a composite molded article using a first mold member to mold a primary molded article by primary molding, switching a movable mold member holding the primary molded article with a movable mold member positioned with a second mold member, then using a second mold member in which the primary molded article is inserted to mold a secondary molded article by secondary molding, wherein the primary molding and the secondary molding are executed by non-continuous different steps at points of time different from each other.

The aspect of the invention relates to a method of molding a composite molded article which performs either of the primary molding and the secondary molding by compression molding reducing a volume of a cavity.

The aspect of the invention relates to a method of molding a composite molded article which, when performing the compression molding, controls a plurality of clamping devices to control compression to hold the movable mold member and first mold member or second mold member parallel.

The aspect of the invention also relates to a mold system for composite molding comprising a first mold member, second mold member, and movable mold member, wherein the movable mold member is positioned to enabling switching between the first mold member and the second mold member and is provided freely engagable/disengagable with the first mold member and the second mold member by a clamper.

The aspect of the invention also relates to a mold system for composite molding wherein the clamper connects and engages the movable mold member and one of the first mold member and the second mold member and engages the other with a gap.

Effects of the Invention

The aspect of the invention is a method of molding a composite molded article using a first mold member to mold a primary molded article by primary molding, switching a movable mold member holding the primary molded article with a movable mold member positioned with a second mold member, then using a second mold member in which the primary molded article is inserted to mold a secondary molded article by secondary molding, wherein the primary molding and the secondary molding are executed by non-continuous different steps at points of time different from each other, so the compression molding in the composite molding can be effectively executed.

According to the aspect of the invention, the method performs either of the primary molding and the secondary molding by compression molding reducing a volume of a cavity, so can mold a low distortion composite molded article.

According to the aspect of the invention, when performing the compression molding, the method controls a plurality of clamping devices to control compression to hold the movable mold member and first mold member or second mold member parallel, so can mold a composite molded article having a uniform sheet thickness and having a high precision.

The aspect of the invention is also a mold system for composite molding comprising a first mold member, second mold member, and movable mold member, wherein the movable mold member is positioned to enabling switching between the first mold member and the second mold member and is provided freely engagable/disengagable with the first mold member and the second mold member by a clamper, so can effectively perform the compression molding in the composite molding without requiring a large sized injection molding machine.

According to the aspect of the invention, the clamper connects and engages the movable mold member and one of the first mold member and the second mold member and engages the other with a gap, so the compression molding can be effectively executed in either of the first mold member and the second mold member.

BEST MODE FOR CARRYING OUT THE INVENTION

An embodiment of the present invention will be explained in detail based on the drawings. FIG. 1 is a vertical sectional view of a clamping device showing a state where a movable mold rotates after primary molding and then starts secondary molding, FIG. 2 is a vertical sectional view of a clamping device showing a state of closing the mold for secondary molding, FIG. 3 is a vertical sectional view of a clamping device showing a state where the mold closing is completed and mold clamping is prepared for, FIG. 4 is a vertical sectional view of a clamping device showing a state where the mold is clamped and the secondary molding is carried out, FIG. 5 is a vertical sectional view of a clamping device showing a state where the mold is opened for the primary molding and the compression molding is prepared for, FIG. 6 is a vertical sectional view of a clamping device showing a state where the injection of the primary molding is carried out, FIG. 7 is a vertical sectional view of a clamping device showing a state where the compression molding of the primary molding is carried out, FIG. 8 is a vertical sectional view of a clamping device showing a state where mold release of the primary molding is carried out, FIG. 9 is a vertical sectional view of a clamping device showing a state where mold release of the secondary molding is carried out, FIG. 10 is a vertical sectional view of a clamping device showing a state where mold opening is carried out, FIG. 11 is a vertical sectional view of a clamping device showing a state where a secondary molded article is taken out, FIG. 12 is a vertical sectional view of a clamping device showing a state after the primary molding and secondary molding end and before the movable mold member rotates, FIG. 13 is a side view of a mold system showing a clamped state, and FIG. 14 is a horizontal sectional view showing another embodiment of composite molding attaching another mold system to another clamping device.

A clamping device 10 configures an injection molding machine together with a first injection device 11 and second injection device 12. The clamping device 10 is configured by a fixed platen 21 attaching a first mold member 13, a movable platen 22 attaching a second mold member 15 and facing the fixed platen 21, a movable mold member 14 which can rotates and move in a mold opening/closing direction between the first mold member 13 and second mold member 15 by a rotating/moving device 17, clamping devices 19 provided in the vicinity of four corners of the movable platen 22 and comprising hydraulic cylinder devices or the like, tie bars 23 formed by extension of rods of hydraulic cylinder devices of the clamping devices 19, engagement devices 20 provided at openings of through holes provided at four corners of the fixed platen 21 on the extension of the tie bars 23 and passing through ends of the tie bars 23 at the fixed platen 21 sides with play, and mold opening/closing devices 18 comprising hydraulic cylinder devices or the like provided as a pair on upper and lower surfaces or front and back surfaces of the fixed platen 21 and making the movable platen 22 approach and/or move away from to the fixed platen 21.

The first mold member 13, movable mold member 14, and second mold member 15 are used to configure a mold system 16. As shown in FIG. 13, the mold system 16 has first clampers 25 and second clampers 26. The first clampers 25 are configured by attachment seats 44 fixed to the positioning surface of the first mold member 13 with the movable mold member 14 while bulging out from the first mold member 13 to the movable mold member 14 side, wedges 41 which can freely slide in square through holes of the attachment seats 44, grooves 40 provided in upper and lower end faces of the movable mold member 14 so as to engage with the wedges 41, connection rods 43 fixed to ends opposite to ends of the wedges 41 engaged with the grooves 40, and two hydraulic cylinder devices 42 provided between the two ends of the connection rods 43 and the attachment seats 44. The first clampers 25 are designed so that gaps G are formed at positioning surfaces of the first mold member 13 and movable mold member 14 when operating the hydraulic cylinder devices 42 to make the wedges 41 engage with the grooves 40. Further, the second clampers 26 are configured by attachment seats 45 fixed to the positioning surface of the second mold member 15 with the movable mold member 14 while bulging from the second mold member 15 to the movable mold member 14 side, wedges 41 which can freely slide in angular through holes of the attachment seats 45, grooves 40 provided in upper and lower end faces of the movable mold member 14 so as to engage with the wedges 41, connection rods 43 fixed to ends opposite to ends of the wedges 41 engaged with the grooves 40, and two hydraulic cylinder devices 42 provided between the two ends of the connection rods 43 and the attachment seats 44. The second clampers 26 are designed so that positioning surfaces of the second mold member 15 and movable mold member 14 contact when operating the hydraulic cylinder devices 42 to make the wedges 41 engage with the grooves 40. Note that, in the mold system 16, the first clampers 25 and second clampers 26 were set as described above in order to make the first mold member 13 perform compression molding, but it is also possible to make the second mold member 15 perform the compression molding. In that case, the positions of the first clampers and second clampers become opposite to those described above.

Here, a composite molded article molded by the mold system 16 will be explained. As composite molded articles, for example, plastic window glasses of buildings, vehicles (automobiles, railroads, etc.), and/or ships and aircraft or other transport machinery, head lamp lens and meter covers and other vehicle use transparent members, illumination lamp covers, solar battery covers or solar battery substrates, liquid crystal/plasma/organic EL and other display panel members (diffusion plates, diffusion films, lens films, cover films, light guide plates, prism lenses, Fresnel lenses, etc.), amusement machine (pachinko machine etc.) parts, etc. can be mentioned. As vehicle use transparent members, plastic windshield (front windows, rear windows, backdoor windows, front/rear side windows, front/rear quarter windows, etc.), head lamp lenses, rear lamp lenses, front bumpers/front grilles, garnishes, plastic bodies (fenders, doors, tail gates, etc.), sun roofs, panoramic roofs, detachable tops, window reflectors, blinker lamp lenses, and other exterior members, meter covers, room lamp lenses, display use front panels, and other interior members, and so on may be mentioned. Here, the vehicle use transparent members form modules of thin sheet shaped windows made of for example transparent thermoplastic resins, for example, transparent polycarbonate resins, and attachment portions of the windows to the vehicles, design parts/shield parts/illumination parts, mechanical members, illumination members, or the like, so include frames molded joined with the windows and made of colored thermoplastic resins, for example, colored polycarbonate resins, alloy-based resins of polycarbonate resins and other resins (polyester resins etc.), thermoplastic elastomers, etc. Parts other than vehicle use transparent members form modules of thin sheet shaped surface layer portions made of thermoplastic resins such as polycarbonate resins with attachment portions with the surface layer portions, design parts/shield parts/illumination parts, mechanical members, illumination members, or the like, so include back layer portions molded joined with the above portions and made of thermoplastic resins such as optically transparent polycarbonate resins, light diffusing polycarbonate resins, alloy-based resins of the polycarbonate resins with other resins (polyester resins, ABS resins, etc.), and thermoplastic elastomers. In this way, many composite molded articles are configured by combinations of parts having different properties. Irrespective of this, they are sometimes configured by parts having the same properties as well for increasing the volume and area of the molded articles. Molded articles of a thin sheet shape disliking distortion as represented by for example windows of vehicle use transparent members are preferably molded by compression molding.

Next, based on FIG. 1 to FIG. 12, a detailed explanation will be given of the method of molding a secondary molded article 30 of the composite molded article in the sequence of steps while mixing in an explanation of the operation of the clamping device 10. Note that the first clampers 25 and second clampers 26 described in FIG. 1 to FIG. 12 are shown in shapes different from those explained in FIG. 13. The shapes of the first clampers 25 and second clampers 26 described in FIG. 1 to FIG. 12 are symbolically expressed for an easy understanding of the functions. Further, when the clampers are in engaged states, these are displayed with their insides shown black. FIG. 1 shows a state before the primary molded article 29 molded by the first mold member 13 in a previous molding cycle is inserted inside the second mold member 15 along with the rotation of the movable mold member 14 and shows a point of time of start of the molding cycle. In this step, all actuators are neutral and do not operate.

FIG. 2 shows a step during the mold closing of the clamping device 10. The movable mold member 14 approaches the first mold member 13 by the rotating/moving device 17 whereby a core portion of the movable mold member 14 on the side where the primary molded article 29 is not held is positioned with the first mold member 13 and a first cavity 35 is formed. Further, simultaneously with that, hydraulic oil is supplied to a mold closing chamber 31 of the mold opening/closing device 18 and makes the movable platen 22 approach the fixed platen 21. In order to facilitate the understanding of this situation, as shown in FIG. 2, the mold closing chamber 31 is displayed hatched. After this, the operation of the other hydraulic cylinder device will be expressed in the same way.

In FIG. 3, the mold opening/closing device 18 is used to move the movable platen 22, the second mold member 15 is positioned with the core portion of the movable mold member 14 on the side where the primary molded article 29 is held, the primary molded article 29 is inserted into the second mold member 15 and, at the same time, a space in the second mold member 15 other than the region occupied by the insertion of the primary molded article 29 is formed as a second cavity 36. At this time, the hydraulic cylinder devices 42 of the second clampers 26 of the mold system 16 are operated, the wedge 41 is engaged with the groove 40, and the movable mold member 14 and second mold member 15 are contacted and fixed. Further, at this time, the four tie bars 23 pass through the through holes of the fixed platen 21, and the engagement grooves 24 provided at the front ends of the tie bars 23 are engaged with projection pins of the engagement device 20.

In FIG. 4, hydraulic oil is supplied to clamping chambers 33 of the four clamping devices 19 to clamp the mold system 16. Then, the second injection device 12 is advanced and its nozzle made to abut against a second sprue bushing 28 communicated with the second cavity 36 of the second mold member 15, then the molten material is injected and filled into the second cavity 36 from the second injection device 12. This step is the secondary molding.

FIG. 5 shows a step of suspending the supply of the hydraulic oil to the mold closing chamber 31 of the mold opening/closing device 18 and supplying the hydraulic oil to the opening chamber 34 of the clamping device 19 to move the movable platen 22 away from the fixed platen 21. Due to this, the movable mold member 14 is fixed to the second mold member 15 by the second clampers 26, therefore the movable mold member 14 is moved away from the first mold member 13 by a predetermined distance and the first cavity 35 is increased in volume. At this time, the movement of the movable mold member 14 is preferably performed parallel to positioning surfaces of the movable mold member 14 and first mold member 13 for executing the compression molding of the thin sheet shaped molded article well. The means for realizing such parallel control is not shown, but is as follows. Namely, a servo valve is connected to the clamping chamber 33 and opening chamber 34 of each clamping device 19, a sensor for measuring the distance between the fixed platen 21 and the movable platen 22 is provided in the vicinity of each clamping device 19, and each servo valve is feedback controlled so that measured value of the sensor coincides with a predetermined value.

In FIG. 6, the first injection device 11 is advanced, the nozzle thereof is made to abut against the first sprue bushing 27 communicated with the first cavity 35 of the first mold member 13, then the molten material is injected into the first cavity 35 increased in volume by a predetermined amount by the above parallel control, positioned, and held from the first injection device 11. This step is the primary molding. The primary molding is executed at a point of time different from that of the secondary molding explained above and the secondary molding is executed in a different step not continuing after the primary molding.

In FIG. 7, compression molding is carried out as a continuous step to the primary molding. The compression molding is carried out by compressing the molten material injected into the first cavity 35 enlarged in FIG. 6 by using four clamping devices 19 to reduce the volume of the first cavity 35 and spreading the molten material in the first cavity 35 to fill the first cavity 35. Then, the primary molded article 29 is shaped. At this time, the movable mold member 14 is fixed to the second mold member 15 to become integral by the second clampers 26, therefore the parallel control explained above by four clamping devices 19 acts directly and effectively with respect to the first mold member 13. As a result, the molten material flows in the first cavity 35 at a high speed and uniformly, therefore the first molded article 29 has a low distortion as the effect of the compression molding and, at the same time, the sheet thickness becomes uniform and high in precision as effects of the parallel control.

In FIG. 8, a mold releasing step of the first molded article 29 from the first mold member 13 is carried out by the same operation as that in FIG. 5.

In FIG. 9, the first clampers 25 are operated so that the first mold member 13 and movable mold member 14 are engaged with a gap G therebetween and, at the same time, the engagement of the second clamper 26 is released. Then, by supplying the hydraulic oil to the opening chamber 34 of the clamping device 19, a larger mold opening force than that by the mold opening/closing device 18 is generated to release the secondary molded article 30 from the movable mold member 14.

In FIG. 10, the engagement of the first clampers 25 is released and, at the same time, the projected projection pins of the engagement devices 20 are retracted to release the engagement of the tie bars 23 and the fixed platen 21. Then, the supply of the hydraulic oil to the opening chamber 34 is stopped and, at the same time, the supply of the hydraulic oil to the mold opening chamber 32 of the mold opening/closing device 18 is started. Due to this, the movable platen 22 opens the mold up to the predetermined position. Further, simultaneously, the movable mold member 14 is moved away from the first mold member 13 by the rotating/moving device 17.

In FIG. 11, after the mold opening step of the movable platen 22 ends and the movable platen 22 is stopped at the predetermined position, the secondary molded article 30 is pushed from the second mold member 15 by a not shown injector device provided in the movable platen 22, and a takeout step of the secondary molded article 30 is carried out.

FIG. 12 shows a state before the primary molding and secondary molding end and the movable mold member 14 rotates and shows a state where one molding cycle ends. After this, the movable mold member 14 rotates by 180 degrees and the point of start of a molding cycle, that is, FIG. 1, is reached.

Next, another embodiment of composite molding by another mold system and another clamping device 60 will be explained based on FIG. 14. A mold system constituted by a movable mold member 52, first mold member 53, and second mold member 54 is attached to a fixed platen 50 and movable platen 51, and the first mold member 53 and second mold member 54 are juxtaposed to each other. The movable mold member 52 is configured so that it can rotate by a rotation drive portion 55 in order to insert the primary molded article molded in the first cavity 58 into the second mold member 54 when it is not positioned with the first mold member 53 and second mold member 54. A first injection device 56 abuts against the first cavity 58, and a second injection device 57 abuts against a second cavity 59 by communicating channels of molten materials. Then, in the same way as the embodiment explained according to FIG. 1 to FIG. 12, after the primary molded article molded in the first cavity 58 in the primary molding is inserted into the second mold member 54, the secondary molded article is molded in the second cavity 59 in the secondary molding. At this time, in the secondary molding, compression molding is not carried out, the movable mold member 52 and second mold member 54 are sufficiently positioned and schematically contacted, and the molded article is molded. On the other hand, in the primary molding, the molten material is injected from the first injection device 56 by increasing the volume of the first cavity 58 while holding the secondary molded article in the second cavity 59, and the compression molding is executed by reducing the volume of the first cavity 58 after that. At this time, the compression force generated between the fixed platen 50 and movable platen 51 is largely biased to the first mold member 53 side, but the compression molding can be effectively carried out without problem by executing the parallel control explained above. The clamping device 60 of FIG. 14 has the advantage that it is not necessary to provide clampers in the mold system although there is the problem that the shape of the injection molding machine is large sized since the first mold member 53 and second mold member 54 are juxtaposed to the fixed platen 50 and movable platen 51.

Note that the present invention includes all possible embodiments to which modifications, corrections, improvements, etc. are made based on the knowledge of persons skilled in the art. Further, the above embodiments to which the modifications etc. are added are included within the scope of the present invention insofar as they do not depart from the gist of the present invention. For example, the movable mold member was illustrated as a rotating one, but the movable mold member may be configured so that it slides upward/downward or leftward/rightward and is switched with the first mold member or second mold member. In particular, this can be easily realized in a clamping device arranging the first mold member and second mold member juxtaposed to the fixed platen and movable platen. Further, the explanation was given as if the first mold member were used for the primary molding and the second mold member were used for the secondary molding, but clearly the second mold member may be used for the primary molding and the first mold member may be used for the secondary molding. Further, an embodiment performing the primary molding by compression molding and performing the secondary molding by not compression molding but injection molding was explained, but performing the primary molding by not compression molding but injection molding and performing the secondary molding by compression molding is also possible. Naturally, the compression can be carried out in the primary molding and the compression molding can be carried out in the secondary molding by using the in-die compression device or the like or the compression molding can be carried out in the primary molding by using the in-die compression device or the like and the secondary molding can be carried out by compression molding.

BRIEF DESCRIPTION OF THE DRAWINGS

[FIG. 3] A vertical sectional view of a clamping device showing a state where the mold closing is completed and mold clamping is prepared for.

[FIG. 5] A vertical sectional view of a clamping device showing a state where the mold is opened for the primary molding and the compression molding is prepared for.

Figure 1:
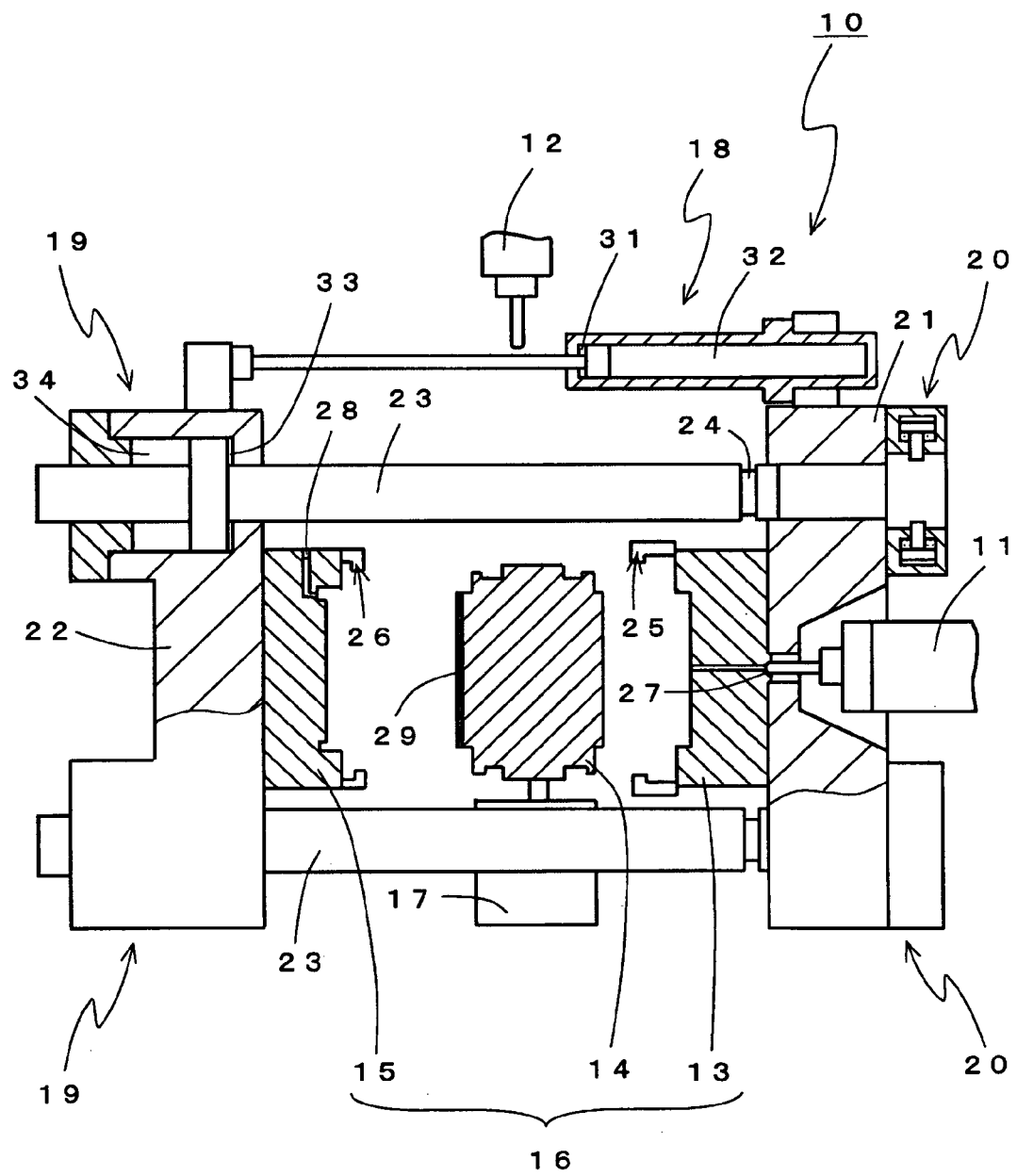
[FIG. 1] A vertical sectional view of a clamping device showing a state where a movable mold rotates after primary molding and then starts secondary molding.
Figure 2:
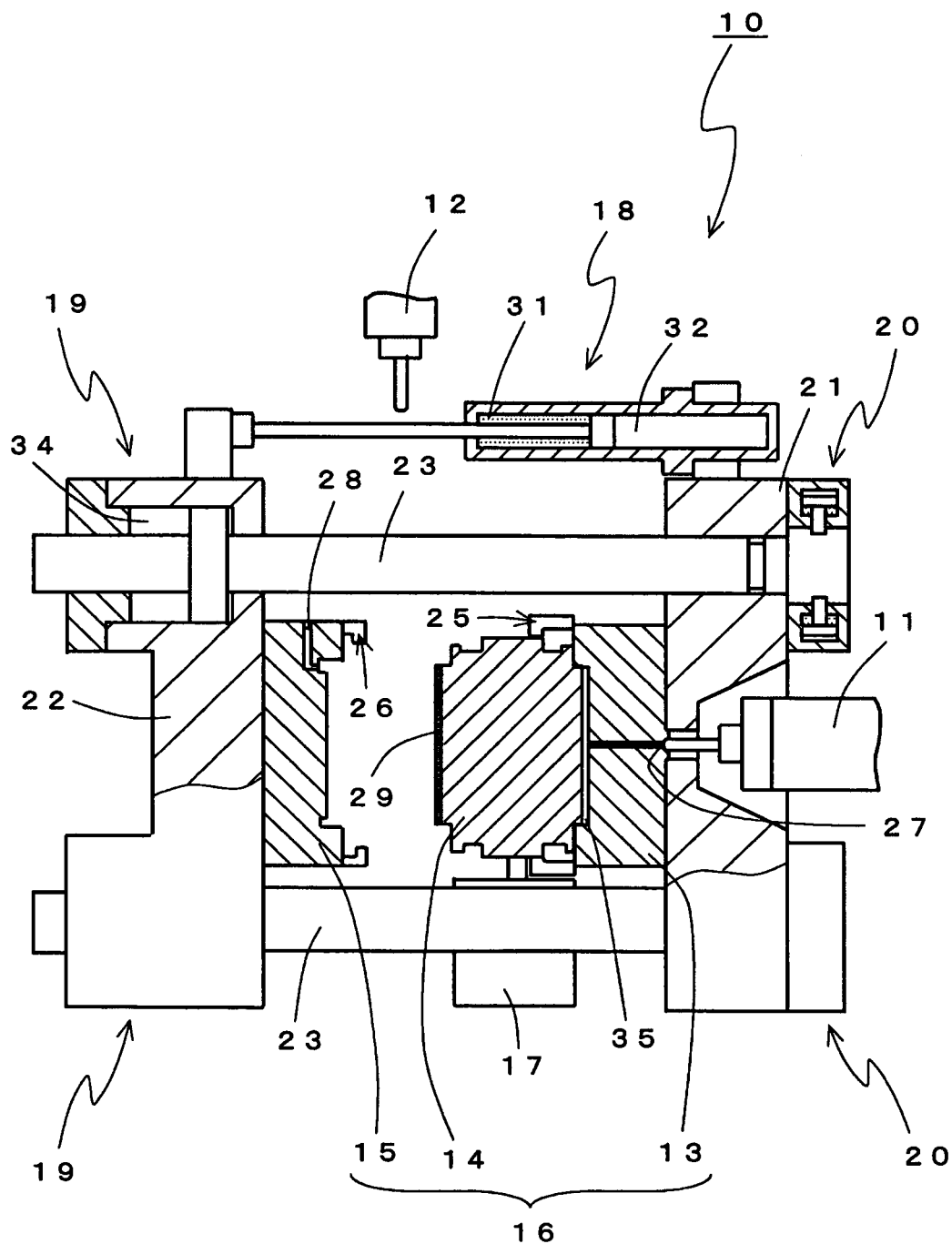
[FIG. 2] A vertical sectional view of a clamping device showing a state of closing the mold for secondary molding.
Figure 3:
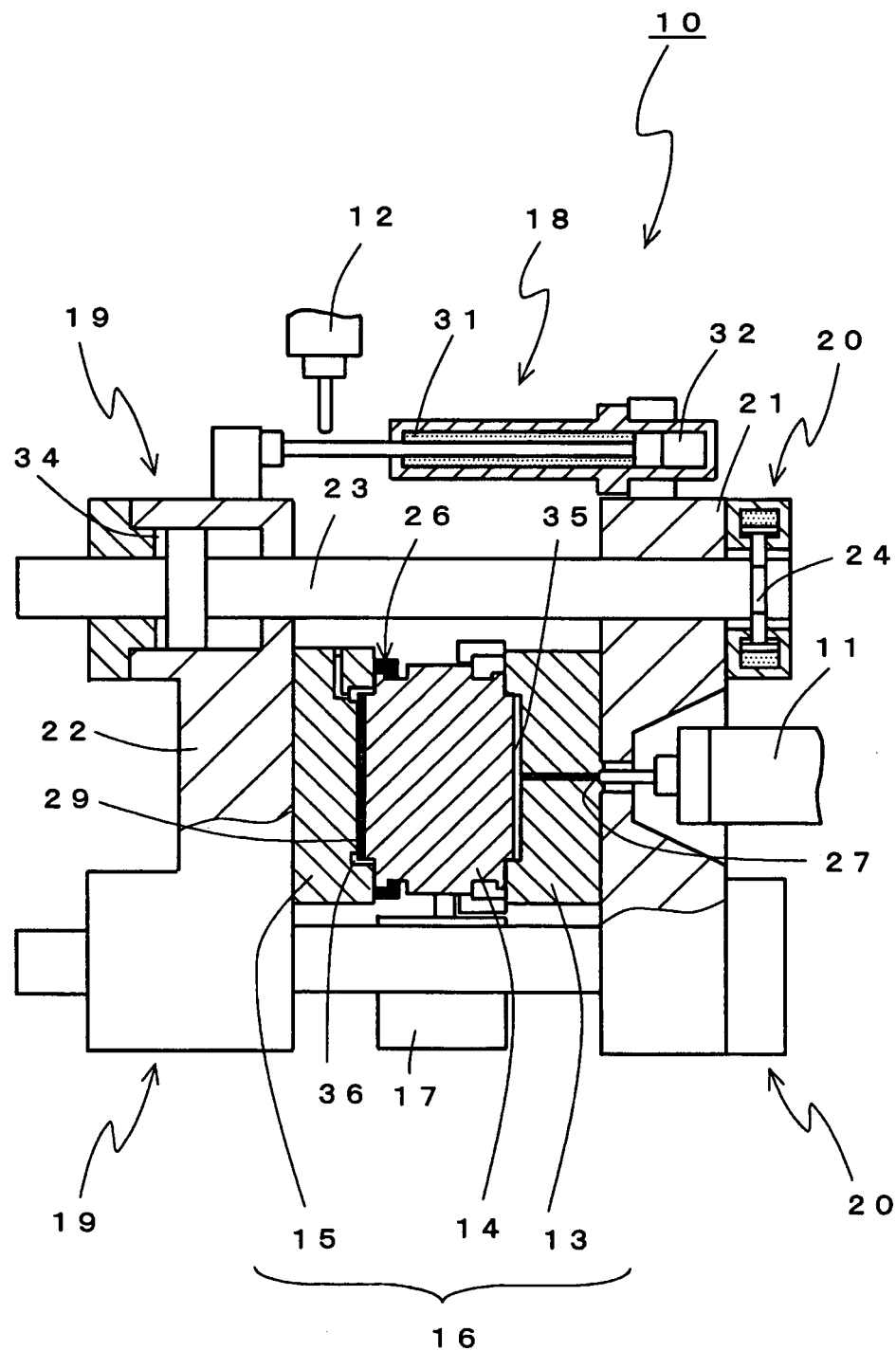
Figure 4:
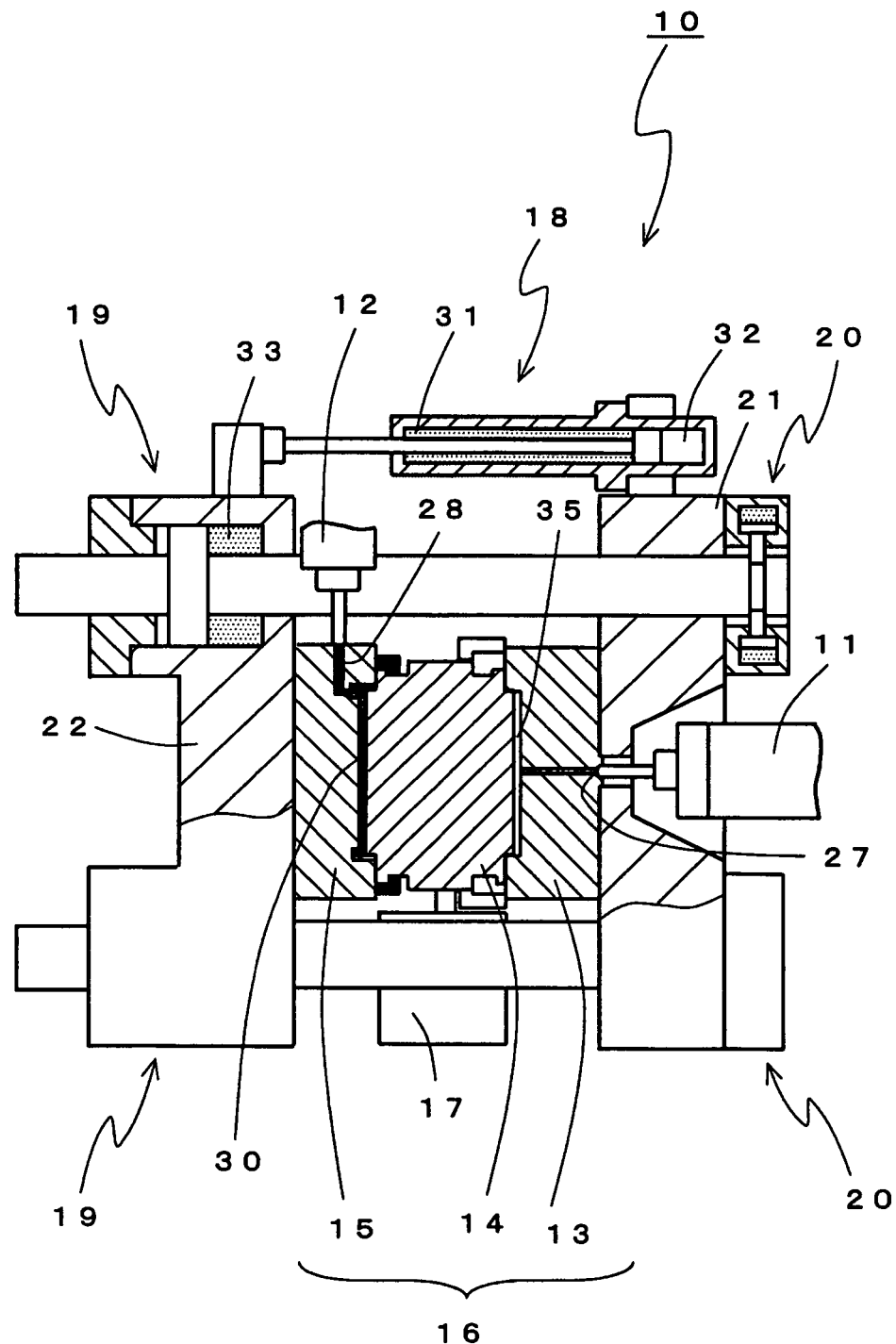
[FIG. 4] A vertical sectional view of a clamping device showing a state where the mold is clamped and the secondary molding is carried out.
Figure 5:
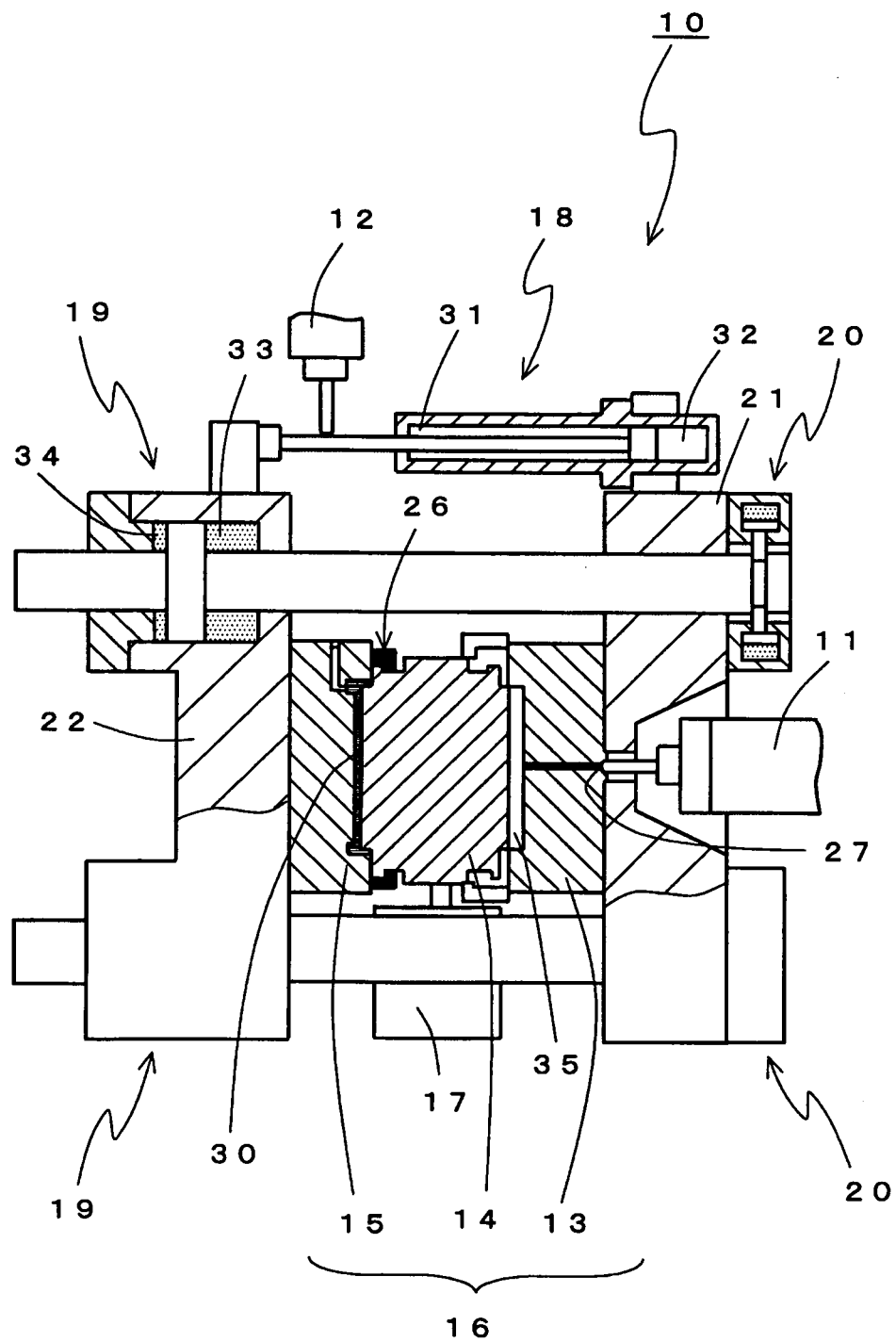
Figure 6:
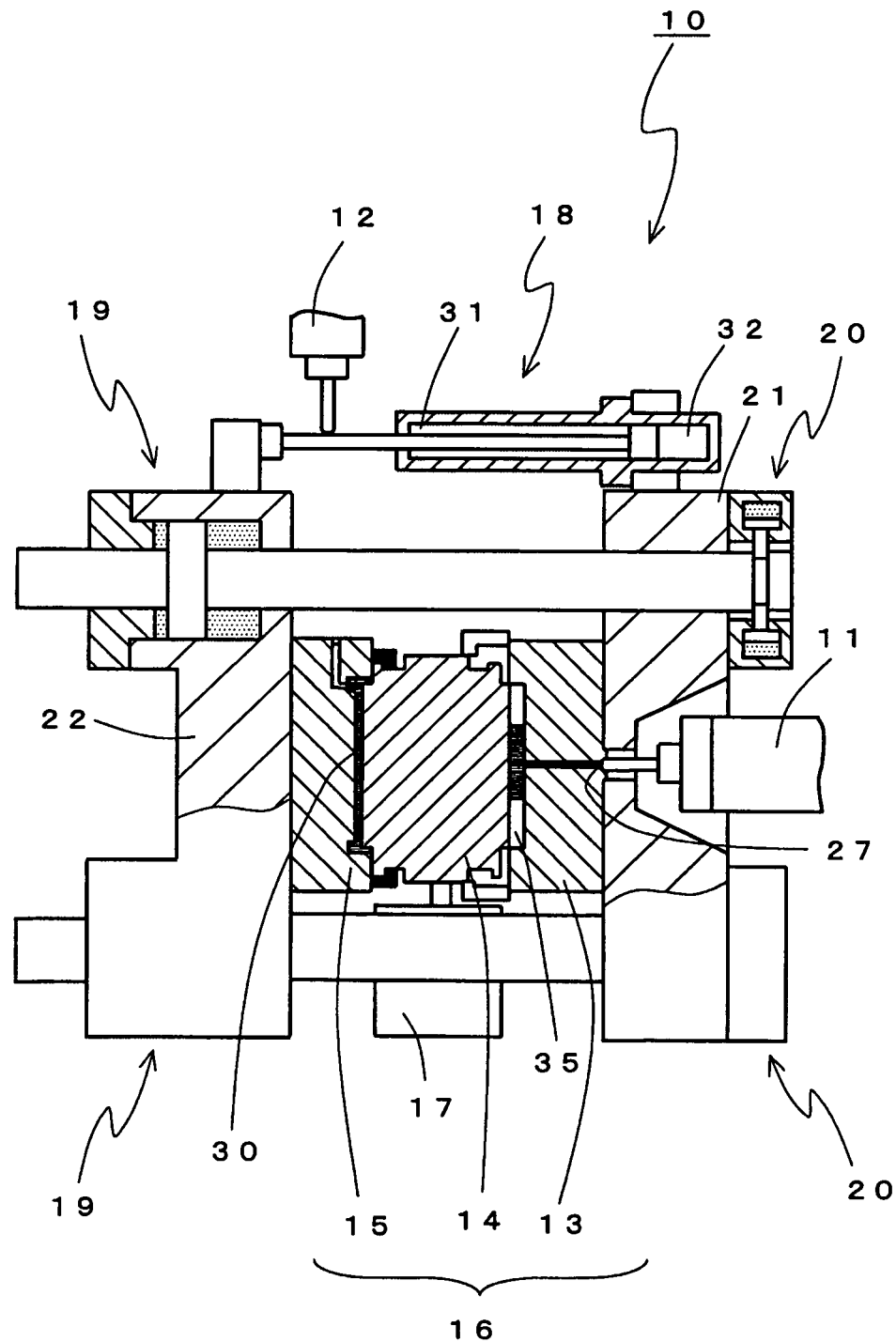
[FIG. 6] A vertical sectional view of a clamping device showing a state where the injection of the primary molding is carried out.
Figure 7:
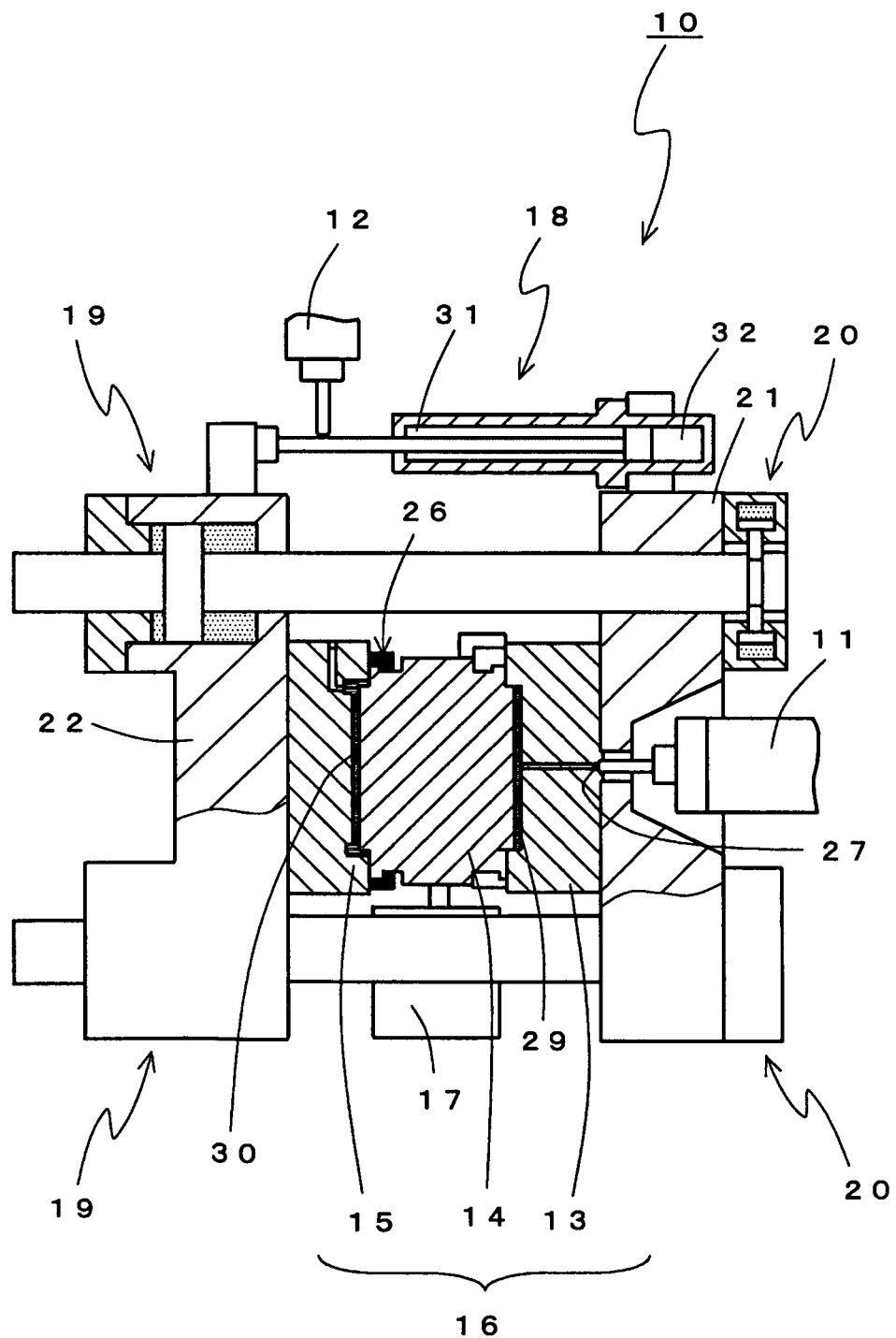
[FIG. 7] A vertical sectional view of a clamping device showing a state where the compression molding of the primary molding is carried out.
Figure 8:
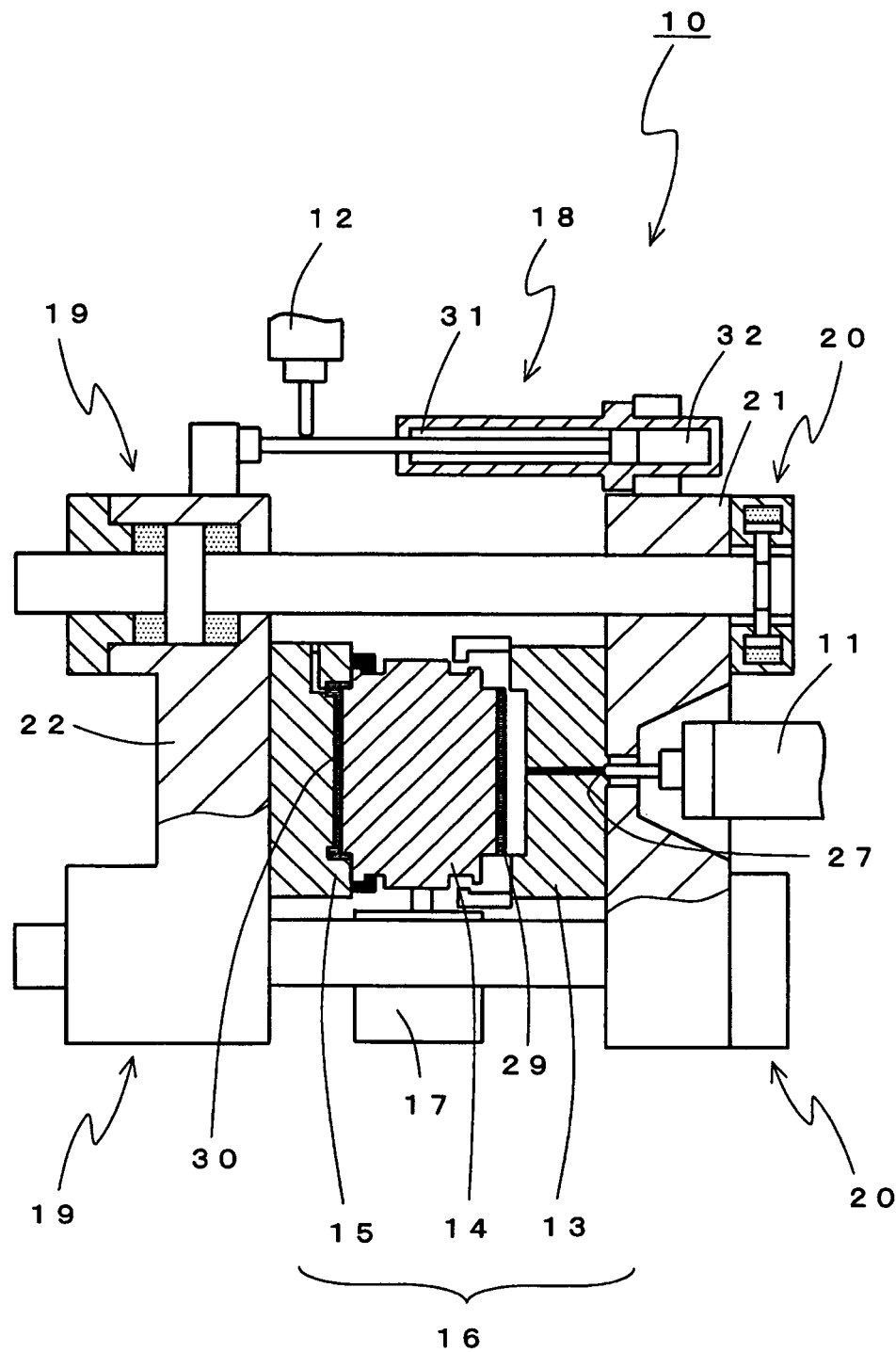
[FIG. 8] A vertical sectional view of a clamping device showing a state where mold release of the primary molding is carried out.
Figure 9:
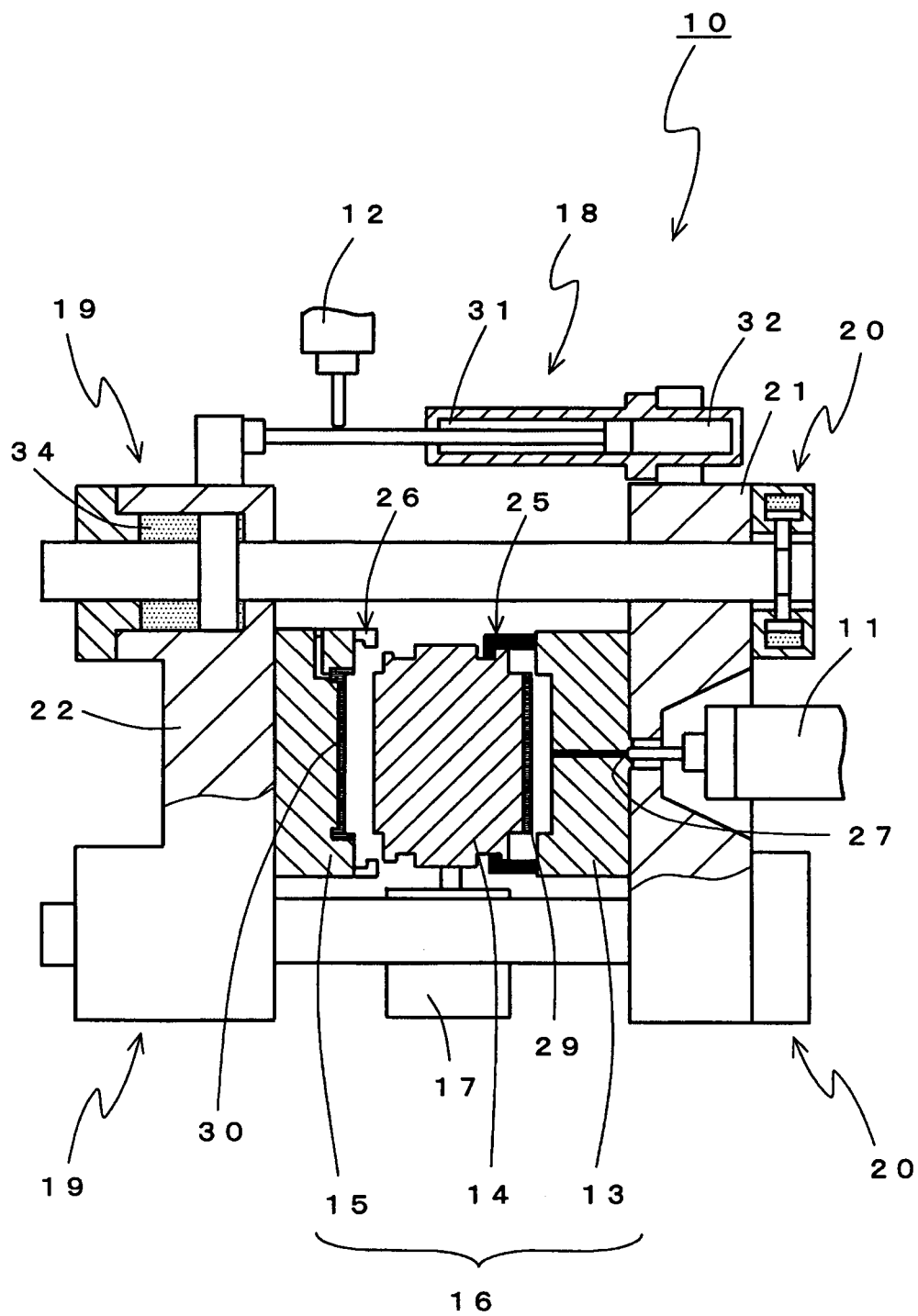
[FIG. 9] A vertical sectional view of a clamping device showing a state where mold release of the secondary molding is carried out.
Figure 10:
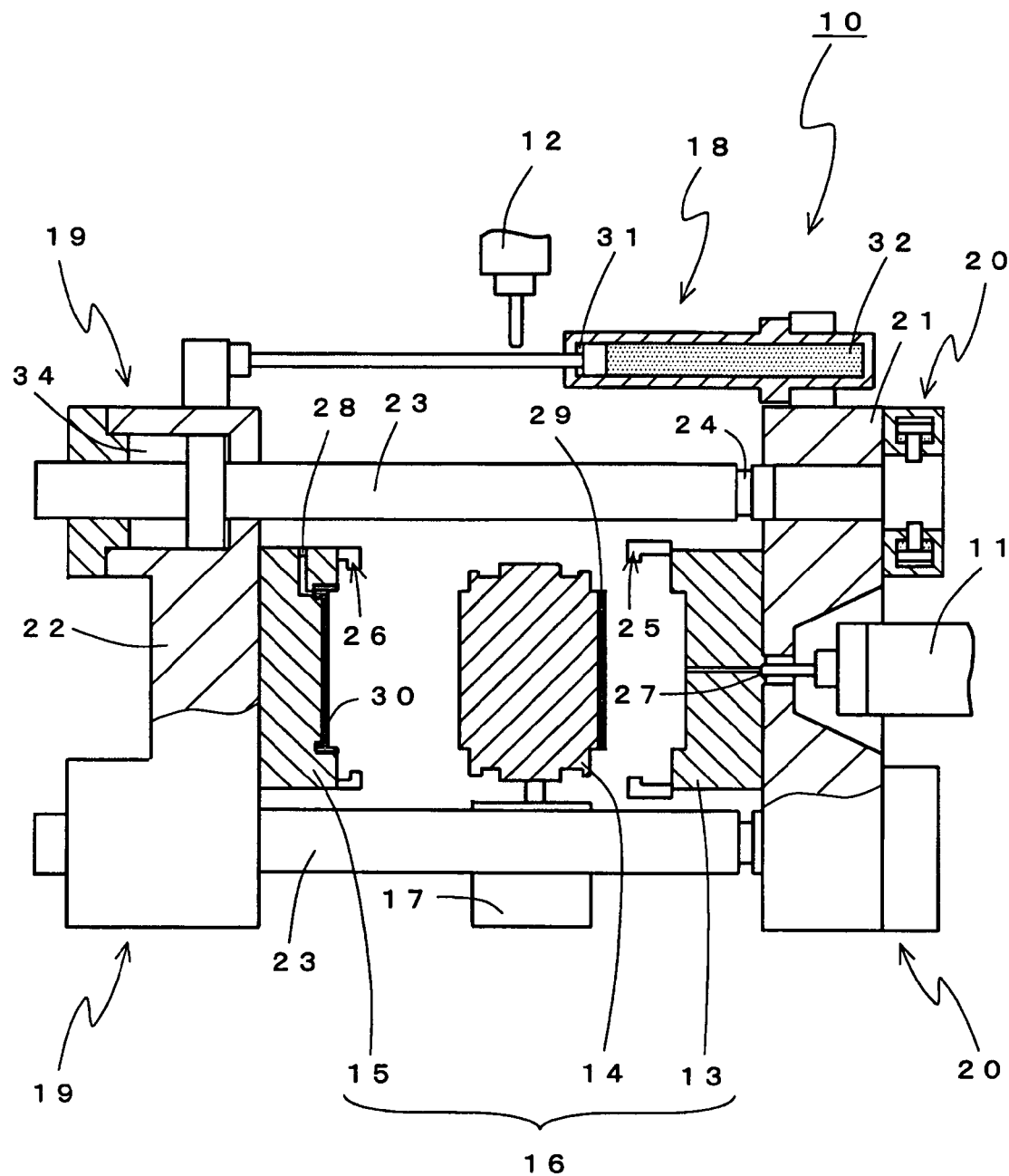
[FIG. 10] A vertical sectional view of a clamping device showing a state where mold opening is carried out.
Figure 11:
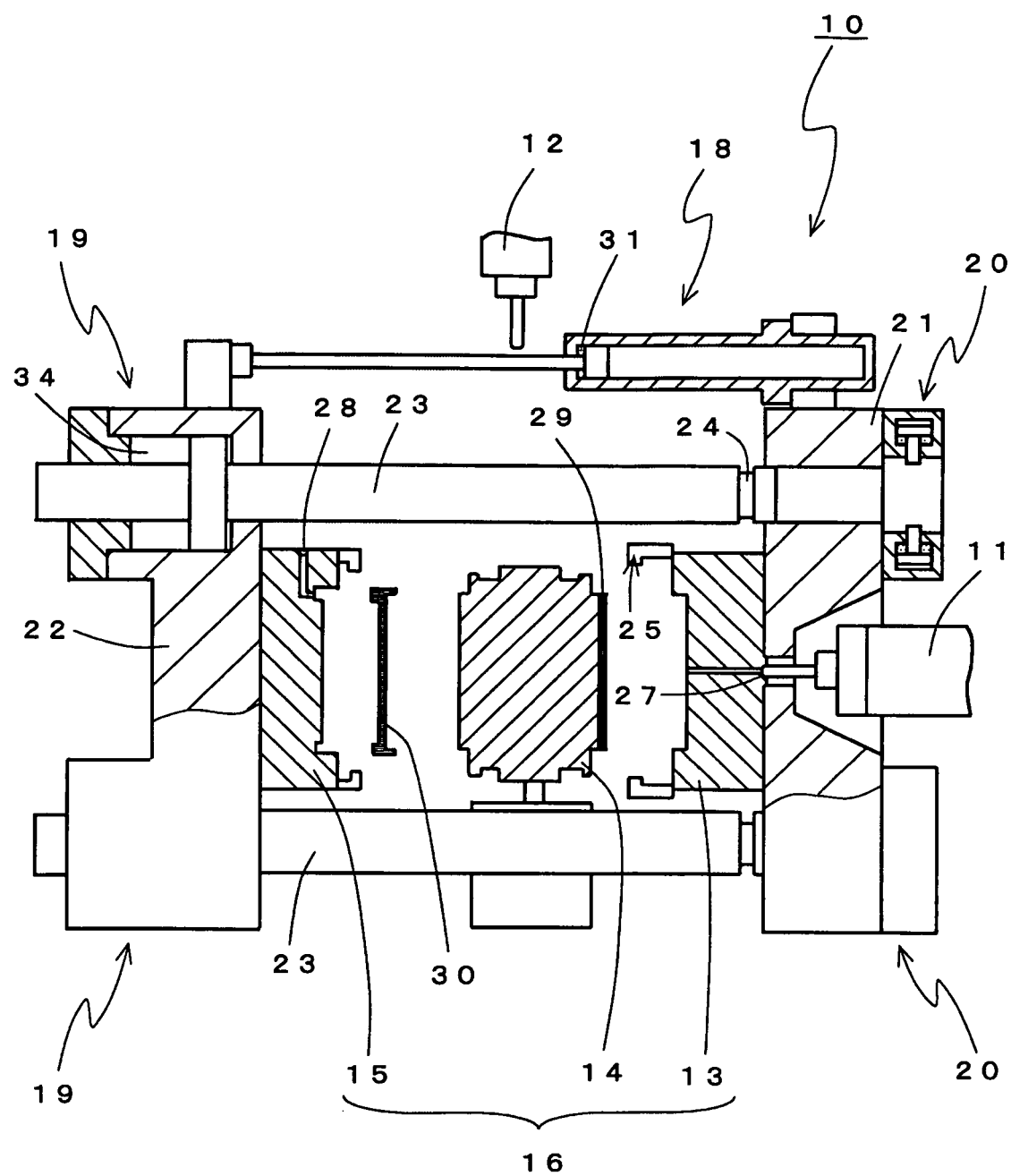
[FIG. 11] A vertical sectional view of a clamping device showing a state where a secondary molded article is taken out.
Figure 12:
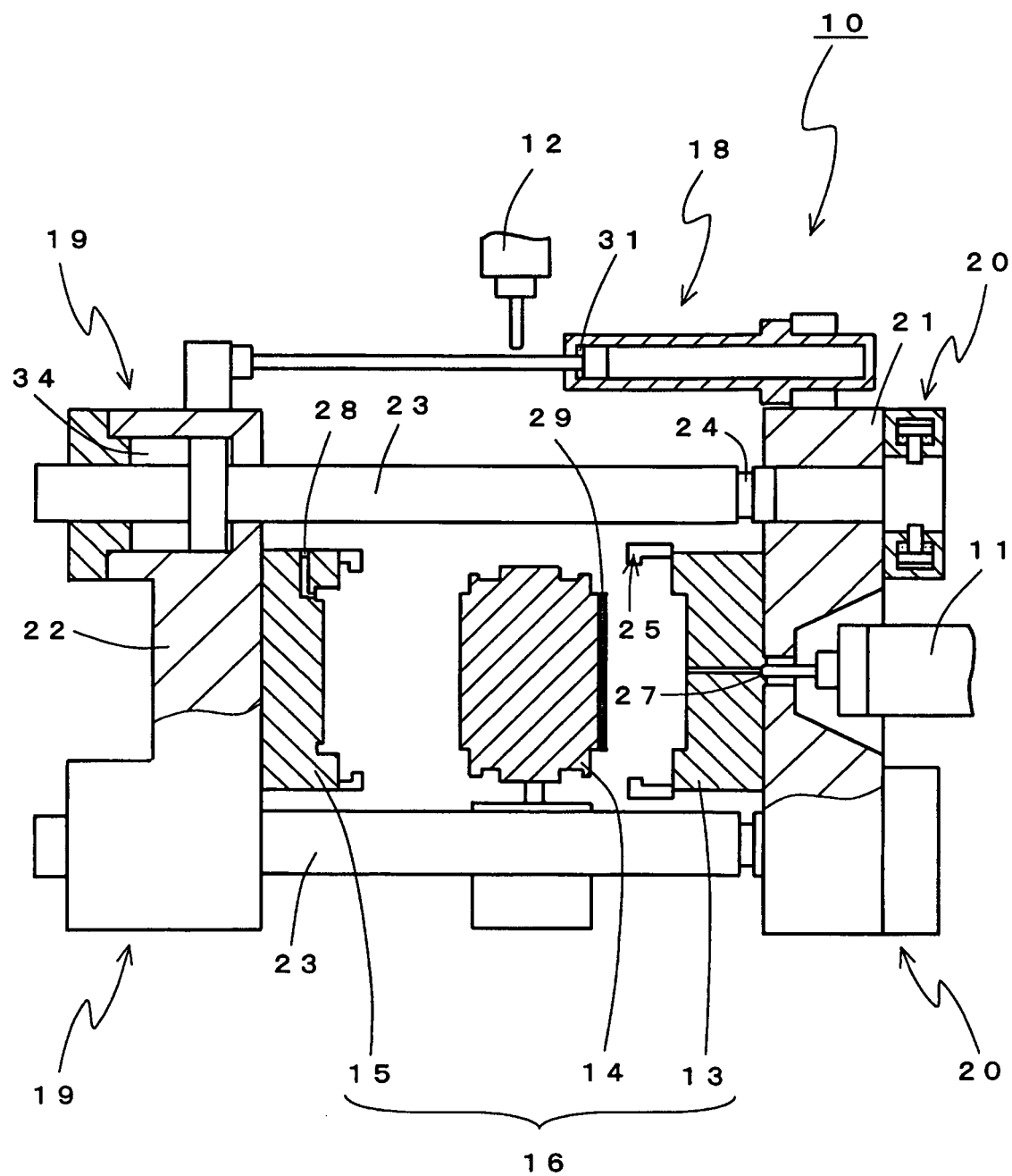
[FIG. 12] A vertical sectional view of a clamping device showing a state after the primary molding and secondary molding end and before the movable mold member rotates.
Figure 13:
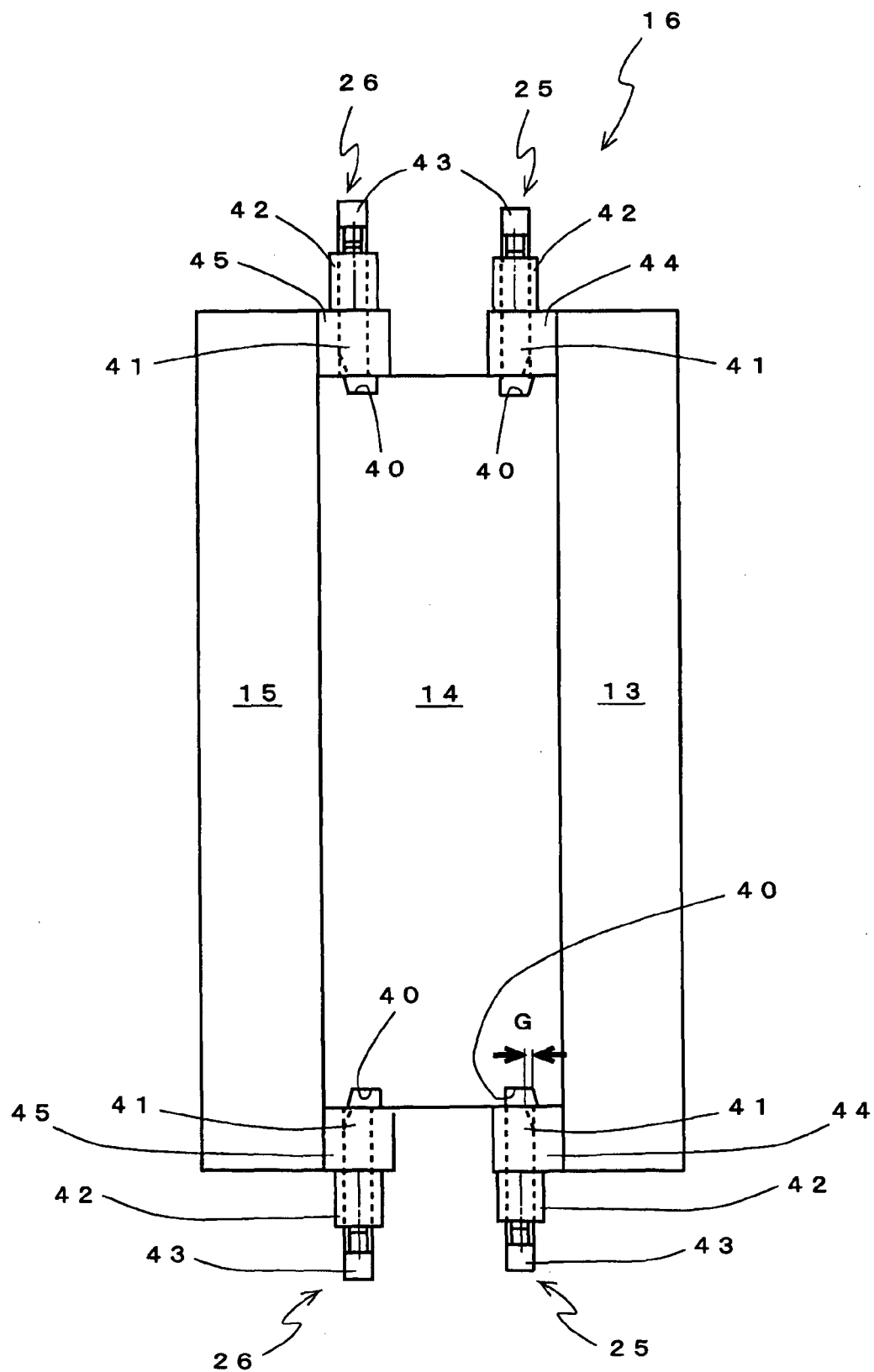
[FIG. 13] A side view of a mold system showing a clamped state.
Figure 14:
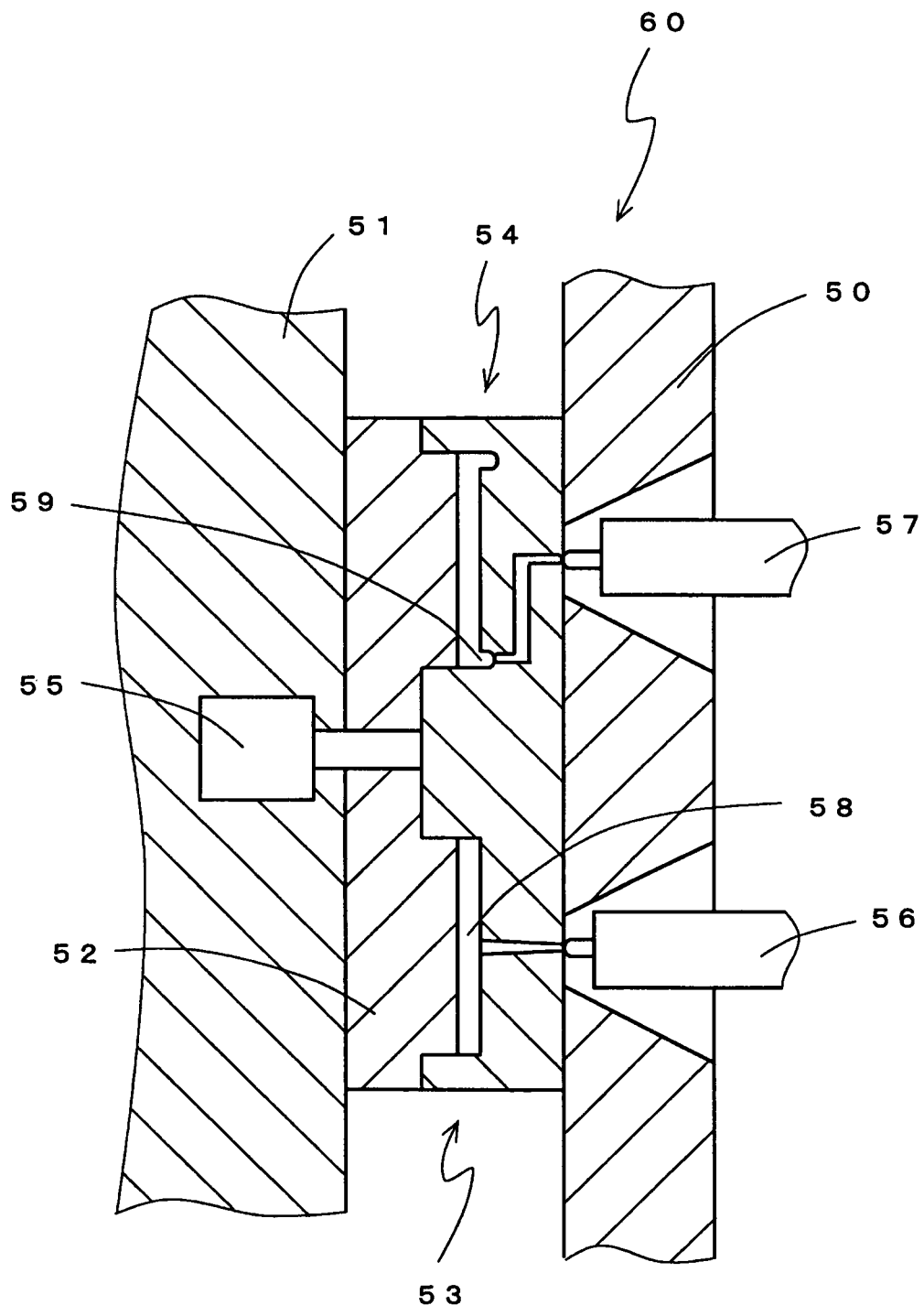
[FIG. 14] A horizontal sectional view showing another embodiment of composite molding attaching another mold system to another clamping device.

DESCRIPTION OF NOTATIONS 10 clamping device
11 first injection device
12 second injection device
13 first mold member
14 movable mold member
15 second mold member
16 mold
18 mold opening/closing device
19 clamping device
21 fixed platen
22 movable platen
25 first clamper
26 second clamper
29 primary molded article
30 secondary molded article
35 first cavity
36 second cavity
G gap

The invention claimed is:

1. A mold system for composite molding comprising:
a first mold member attached to a fixed platen for a primary molding, a second mold member attached to a movable platen for a secondary molding, and a movable mold member which can rotate and move in a mold opening/closing direction between the first mold member and the second mold member,
said mold system characterized in that:
the movable mold member is positioned to enable switching between the first mold member and the second mold member;
the movable mold member is provided freely engagable/disengagable with the first mold member and the second mold member by clampers;
the movable mold member approaches to the first mold member to form a first cavity, the movable platen to which the second mold member is attached approaches to the movable mold member to form a second cavity upon which the mold closing is completed;
either of the primary molding and the secondary molding can be performed by either of the first mold member or the second mold member;
the primary molding and the secondary molding are executed by non-continuous different steps at points of time different from each other; and
either of the primary molding and the secondary molding is performed by compression molding reducing a volume of the first or second cavity;
with the mold member for the compression molding opening to increase a volume of the cavity for the compression molding before the compression molding step; and
the primary molding is performed after the secondary molding in which the primary molded article is inserted to mold a secondary molded article.

2. The mold system for composite molding as set forth in claim 1, wherein the clamper connects and engages the movable mold member and one of the first mold member and the second mold member and engages the other with a gap.

3. A mold system for composite molding comprising:
a first mold member attached to a fixed platen for a primary molding, a second mold member attached to a movable platen for a secondary molding, and a movable mold member which can rotate and move in a mold opening/closing direction between the first mold member and the second mold member,
said mold system characterized in that:
the movable mold member enables switching a position facing to the first mold member and the second mold member;
the movable mold member is freely combined with the first mold member or the second mold member by a clamper;
the movable mold member approaches to the first mold member to form a first cavity, the movable platen to which the second mold member is attached approaches to the movable mold member to form a second cavity upon which the mold closing is completed;
the primary molding and the secondary molding can be performed by either the first mold member or the second mold member;
the primary molding and the secondary molding are not operated at the same time executed by discontinuous different timing step from each other; and either of
the primary molding and the secondary molding is performed by compression molding reducing a volume of the first or second cavity;
with the mold member for the compression molding opening to increase a volume of the cavity for the compression molding before the compression molding step; and the movable member and the second mold member are combined together to perform the compression molding.

4. The mold system for composite molding as set forth in claim 3, wherein the clamper connects and engages the movable mold member and one of the first mold member and the second mold member and engages the other with a gap.

* * * * *

UNITED STATES PATENT AND TRADEMARK OFFICE
CERTIFICATE OF CORRECTION

PATENT NO. : 8,408,890 B2  Page 1 of 1
APPLICATION NO. : 11/990398
DATED : April 2, 2013
INVENTOR(S) : Fukumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this
First Day of September, 2015

Michelle K. Lee
*Director of the United States Patent and Trademark Office*